INVENTORS
THEODORE VERMEULEN
MICHAEL JOHN KEATON
BY Stanley Bialos
Donovan J. DeWitt
ATTORNEYS

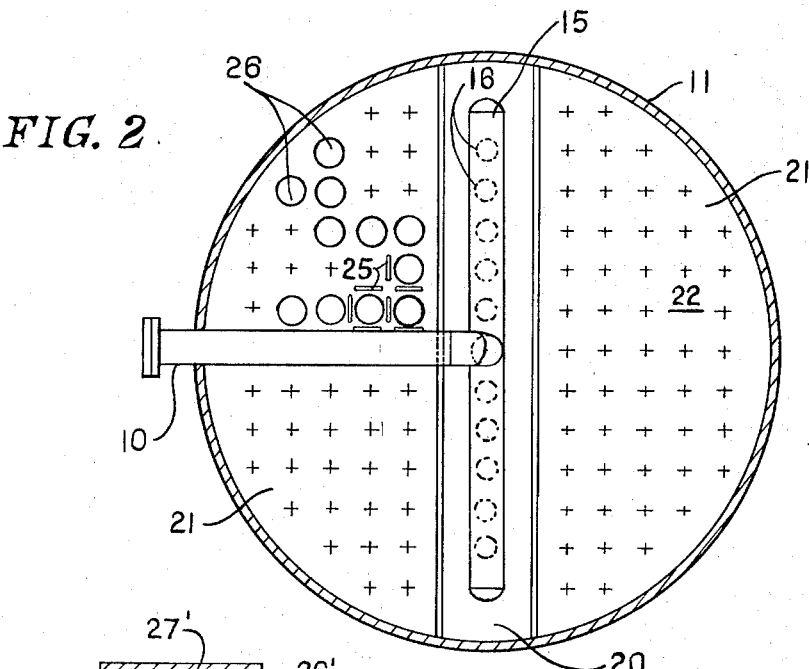
FIG. 2
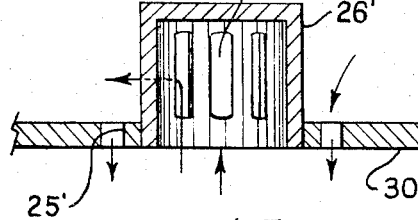
FIG. 5
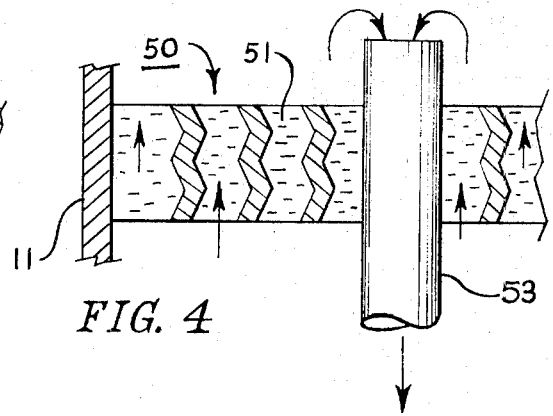
FIG. 4
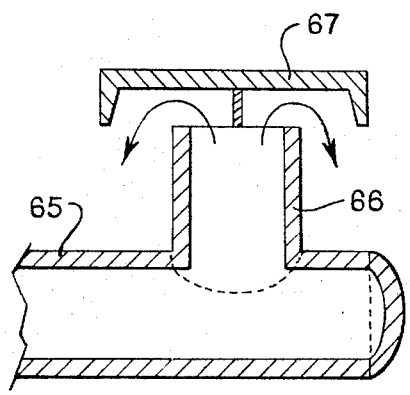
FIG. 6
FIG. 3
INVENTORS
THEODORE VERMEULEN
MICHAEL JOHN KEATON
ATTORNEYS

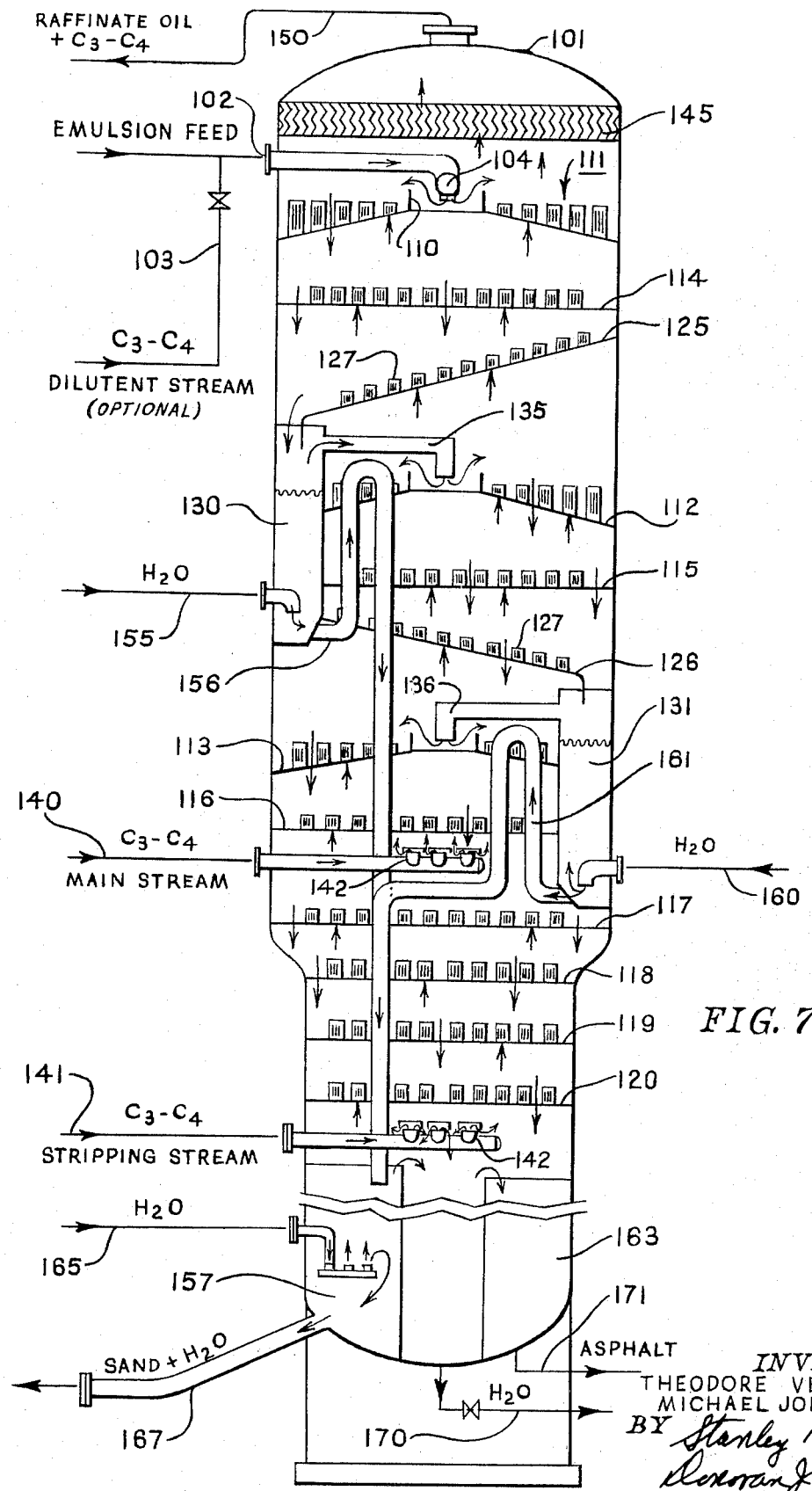

INVENTORS.
THEODORE VERMEULEN
MICHAEL JOHN KEATON
BY
ATTORNEYS

United States Patent Office 3,684,699
Patented Aug. 15, 1972

3,684,699
PROCESS FOR RECOVERING OIL FROM TAR-OIL FROTHS AND OTHER HEAVY OIL-WATER EMULSIONS
Theodore Vermeulen, Berkeley, and Michael John Keaton, Piedmont, Calif., assignors to The Regents of the University of California
Filed Feb. 10, 1971, Ser. No. 114,141
Int. Cl. C10g 33/04, 21/00; C10c 1/18
U.S. Cl. 208—188                                      6 Claims

ABSTRACT OF THE DISCLOSURE

Tar-oil froths and other heavy oil-water emulsions are demulsified by the addition of a propane-butane solvent at or above the condensation pressure thereof, and at temperatures in a range of 170° to 240° F., the proportions used ranging from about 0.5 to 10 volumes of the solvent per volume of oil contained in the feed emulsion. The coalesced water phase and one or more oil phases, along with sand particles, are thereafter separated and recovered. When using about 3.5 to 10 volumes of the solvent per volume of oil, the emulsion may be broken and separated into a water phase and into raffinate oil and asphaltic fractions of controllable quantity and purity. When using 0.5 to 2 volumes of the solvent per volume of oil, the oil is dehydrated but not deasphalted. The several demulsification and product separation steps can be practiced in a pressure column which is provided near its top with an inclined feed-distribution tray pierced by cylindrical riser units and slotted to allow through-flow downward. Sand particles present in the feed, along with water and optionally asphalt, pass downwardly through the tray for discharge into one or more gravity-settling chambers, while the remaining oil components of the emulsion are carried upwardly either for discharge from the column or for return to a lower portion thereof for second-stage gravity-settling or for deasphalting.

BACKGROUND OF THE INVENTION

Tar sands such as those found in the Athabasca region of Canada constitute an important source of crude oil. The tar-oil which can be separated from the mineral components of the sand is found to contain about 65 to 80% of a "gas-oil" fraction relatively rich in hydrogen, while the balance is made up of asphaltenes (hydrogen-poor polyaromatics) along with organometallic salts.

Present-day large-scale techniques for separating the crude oil from tar sands are built around the hot water extraction process. In this process, which operates at approximately 195° F., hot water is employed to disintegrate the tar sand and dislodge the oil by the combined action of selective wetting of the sand, softening of the tar oil, and mechanical agitation. The product of this process, an extremely stable emulsion of oil, water, air, and colloidal sand, is commonly termed a "froth." It usually contains from about 10 to 30% by weight of water and is a viscous, pumpable liquid. Various beneficiation processes for recovering the oil from such froths have been proposed, including dilution, heating, addition of demulsifying agents, electrostatic precipitation, centrifuging or cycloning. However, each of these methods, as currently practiced, is relatively expensive and is characterized by incomplete recovery of the oil.

It is an object of this invention to provide a method whereby tar-oil froths and other heavy oil-water emulsions, including those recovered from oil shales, can be economically separated into their respective oil, water and mineral phases, preferably with attendant separation of said oil phase into a relatively hydrogen-rich raffinate oil fraction and an asphaltic fraction which also contains any organometallic compounds present. A further object is to provide apparatus adapted to implement the aforesaid separation steps.

SUMMARY OF THE INVENTION

The present invention rests on the discovery that tar-oil froths and other heavy oil-water emulsions can be demulsified and separated into their respective oil, water and mineral (sand) components by admixing therewith from about 0.5 to 10 volumes of a liquid $C_3$–$C_4$ solvent per volume of oil (i.e., dry oil) contained in the emulsion, while maintaining the resultant system at temperatures in a range of 170° to about 240° F. and at pressures which are at or above those required to maintain the solvent in the liquid condition at the temperatures employed. When using from about 3.5 to 10 volumes of the solvent per volume of oil, there results under these conditions a still further separation whereby the oil component is divided into a solvent-rich raffinate oil fraction and an asphaltic fraction which will be found to contain any organometallic compounds which are present in the emulsion feed. This separation is referred to herein as "deasphalting." When it is desired merely to effect a separation of the water and oil phases of the emulsion, without attendant deasphalting of the oil, then the $C_3$–$C_4$ solvent is preferably employed in the amount of 0.5 to 2 volumes per volume of oil so as to avoid separating the oil phase into two layers.

In carrying out the present invention, it is found that separation of the several phases can be accomplished by gravity using one or more interconnecting settling chambers. In these operations, the water settles out to the bottom carrying with it the sand or other solid particles which were present in the emulsion used as the feed stock. The oil component thereof, which also contains the added $C_3$–$C_4$ solvent, floats on the water, and when the amount of solvent employed is sufficiently large as to induce deasphalting to occur, then an asphaltic layer will form next to the water, while a raffinate oil layer, containing the larger portion of the solvent, will form as the uppermost layer.

The $C_3$–$C_4$ hydrocarbon solvent employed in the process of the present invention (referred to also as propane-butane solvent) acts to resolve the emulsion feed by dissolving the viscous oily membranes surrounding the water droplets and setting free the ultra fine mineral (sand) particles in the membranes which stabilize the emulsion. The $C_3$–$C_4$ hydrocarbons which can be employed for this purpose are propane, propene, isobutane, normal butane and the several butenes. Preferably, the solvent streams employed constitute either pure propane or a mixed propane-n-butane, propane-isobutane, or propane-n-butane-isobutane stream which contains 90 to 50% by volume of propane together with from about 10 to 50% by volume of n-butane and/or isobutane.

To insure the necessarily low viscosity of the emulsion, along with efficient demulsification and separation of the emulsion into its oil and water phases, or into raffinate oil, asphaltic and water components, it is critically important to a practice of this invention to employ temperatures of from 170° to about 240° F. in the pressure column or other vessel employed to effect demulsification and phase separation. Having determined the make-up of the $C_3$–$C_4$ solvent and the temperature (or profile of temperature values) to be employed, an operating pressure is then selected which will be at or above that required to maintain the solvent in the liquid condition throughout the course of the demulsification and phase-separation steps. At system temperautres approaching the critical temperatures for the solvent, it should be noted that the density thereof can be changed in considerable measure by using pressures which are well above threshold pressures required to maintain solvent liqudity. Thus, adjustment of the pressures (along with temperature and solvent ratio) in the manner known to those skilled in the art provides operational control of quality and recovery for the raffinate and asphaltic components of the emulsions employed as feedstocks.

The present invention is intended to be employed either in batch operations or preferably in those of a continuous nature. In the batch method, a given amount of the emulsion is treated with the $C_3$–$C_4$ solvent under the requisite conditions of temperature, pressure, and oil-solvent volume, after which the demulsified mixture is allowed to settle. The resultant layers are then recovered from the vessel in which the separation occurs.

In the continuous method of operation, the emulsion feed is continuously pumped into and through a liquid-full vessel or column where, in the presence of the $C_3$–$C_4$ solvent which is also continuously supplied to the column, the emulsion demulsifies and separates into its respective oil, water and mineral (sand) components. The incoming emulsion feed which may have been prediluted with solvent (usually not more than 2 volumes per volume of oil), is fed onto a feed distribution tray positioned in an upper portion of the column. Any further amounts of solvent required above those employed as diluent are then continuously added directly to the column. Thus, when deasphalting is to accompanying dehydration, the major portion of the solvent is added at a lower position within the column to dissolve out from the descending asphalt a less dense raffinate oil which is carried upwardly in the column with the bulk of the solvent.

On being supplied to the feed distribution tray of the column in contact with the $C_3$–$C_4$ solvent, the emulsion rapidly demulsifies and coalesces into its component phases. The more dense of these phases (containing sand, water, and also asphalt when the solvent ratio employed is high enough to induce simultaneous dehydration and deasphalting) work their way downwardly in the column to a series of gravity-settling chambers from which they are separately and continuously withdrawn. The lighter portions of the emulsion (i.e., either the whole crude oil component or a raffinate oil fraction as obtained when deasphalting is occurring) move upwardly in the column and are continuously collected at a position above the feed distribution tray along with the $C_3$–$C_4$ solvent. When the oil fraction so recovered above the feed distribution tray contains asphaltic components, it is preferably passed to a second gravity-settling chamber to permit further amounts of water (and sand) to settle out and be removed from the column. The resulting dehydrated oil is then ready for deasphalting by treatment with larger relative volumes of the $C_3$–$C_4$ solvent in a concomitant step, or may be fed to other conventional petroleum-refining processes.

As noted above, the step of deasphalting the whole crude oil component of the emulsin can be practiced either simultaneously with or consecutively to the step of dehydration, in which the water phase is caused to settle out for removal in one or more successive stages of demulsification with settling. In the simultaneous method of operation, the emulsion feed is brought into intimate engagement with from about 3.5 to 10 volumes of the $C_3$–$C_4$ solvent for each volume of oil present in the emulsion. Using a pressure column of the type referred to above, this can be effected by continuously discharging the emulsion onto the feed distribution tray where it immediately comes into contact with liquid comprising mostly $C_3$–$C_4$ solvent but containing some oil already dissolved in it at lower levels of the column during its upward flow. A small portion of the solvent, not larger than about 2 volumes per volume of oil, can be premixed with the emulsion feed stream supplied to the column, while the major portion of the solvent, or the entire amount thereof, is continuously added at one or more lower positions in the column for upward movement therein. In this method of operation an upwardly moving liquid stream comprised of the solvent along with dissolved raffinate oil is continuously discharged from the column above the feed distribution tray, usually after passing through a baffle zone to disentrain any colloidally suspended insoluble droplets or particles. The asphaltic fraction of oil, along with water, sand and some raffinate oil, moves downwardly in the column below the distribution tray for contact with the rising solvent-rich stream. Provision is made at this stage of the operation to continuously separate and remove from the column, in one or more stages of gravity settling, the water phase which, along with sand particles, separates from the balance of the liquid. The asphaltic components continue their downward passage in the column through the rising solvent stream which acts to dissolve, and carry upwardly with it, essentially all of the raffinate oil. The fully stripped asphalt is then continuously taken off near the bottom of the column.

In the consecutive method of continuous operation, the emulsion fed to the feed distribution tray of the column is first separated into its respective (crude) oil and water phases in the presence of from about 0.5 to 2 volumes of the $C_3$–$C_4$ solvent per volume of said oil as preferably premixed with the emulsion outside the column. As demulsification occurs, the water and mineral (sand) settle below the distribution tray into a gravity settling chamber from which they are continuously removed. The solvent-containing oil phase recovered above said tray can then be subjected to deasphalting either in another portion of the same column or in a separate column, preferably after having been given a second or even a third or fourth demulsification-settling treatment in gravity settling chambers from which water is continuously removed. The recovered solvent-containing dehydrated oil is in itself a useful product and can be processed by any one of various alternative refinery techniques. However, in accordance with a preferred embodiment of the present invention, said oil is deasphalted by passing the same countercurrently to a rising stream of the $C_3$–$C_4$ solvent which is present in a total amount of 3.5 to 10 volumes per volume of dry oil, including the solvent present in the dehydrated oil. This operation is, of course, also conducted at temperatures of 170° to 240° F. and at pressures which are at or above those required to maintain the solvent in the liquid state.

The process of the present invention is well adapted to be carried out in a pressure column of novel construction which is provided near its top with a distribution tray having a feed-receiving trough from which the feed, in the presence of liquid $C_3$–$C_4$ solvent, overflows onto downwardly inclined plate sections pierced by cylindrical riser units and slotted to allow throughflow downward. The column is provided with one or more settling chambers positioned serially below the feed distribution tray which serve to collect water, sand and optionally an asphalt-rich oil fraction, all of which pass downwardly in the column from the distribution tray. The remaining oil portions of the emulsion, along with the $C_3$–$C_4$ solvent, are carried upwardly in the column above said tray either for discharge from the column or for return to a lower portion thereof for further gravity settling, deasphalting or other processing. The column is provided with outlets whereby the water phase and sand which settle out in the various settling chambers may continuously be removed from the column. Similarly, provision is made to collect any asphalt phase in said chambers and to transport the same either out of the column or to a stripping zone in the column, for removal of contained raffinate oil.

The invention will be more clearly understood by reference to the figures of the appended drawings in which various of the valves, pumps, compressors, heaters and instruments for controlling temperature, pressure and water-oil interface levels have been omitted, the nature and arrangement thereof being obvious to those skilled in the art, in the light of the present description. In the drawings:

FIG. 2 is a plan view, to an enlarged scale, looking in the direction of arrow 2 in FIG. 1 and showing the feed distribution tray;

FIG. 3 is an enlarged fragmentary sectional view taken along the margin of the feed distribution tray of FIG. 2, and showing a vertically slotted riser positioned above the tray and down-flow slots in the tray;

FIG. 4 is an enlarged fragmentary section view of the water-disentrainment baffle positioned at the top of the column;

FIG. 5 is a view similar to that of FIG. 3, but taken through a typical tray in the column such as that positioned above the feed distribution tray;

FIG. 6 is an enlarged fragmentary section view showing the mounting of a distribution baffle above a solvent outlet nozzle within the column;

Figure 8:
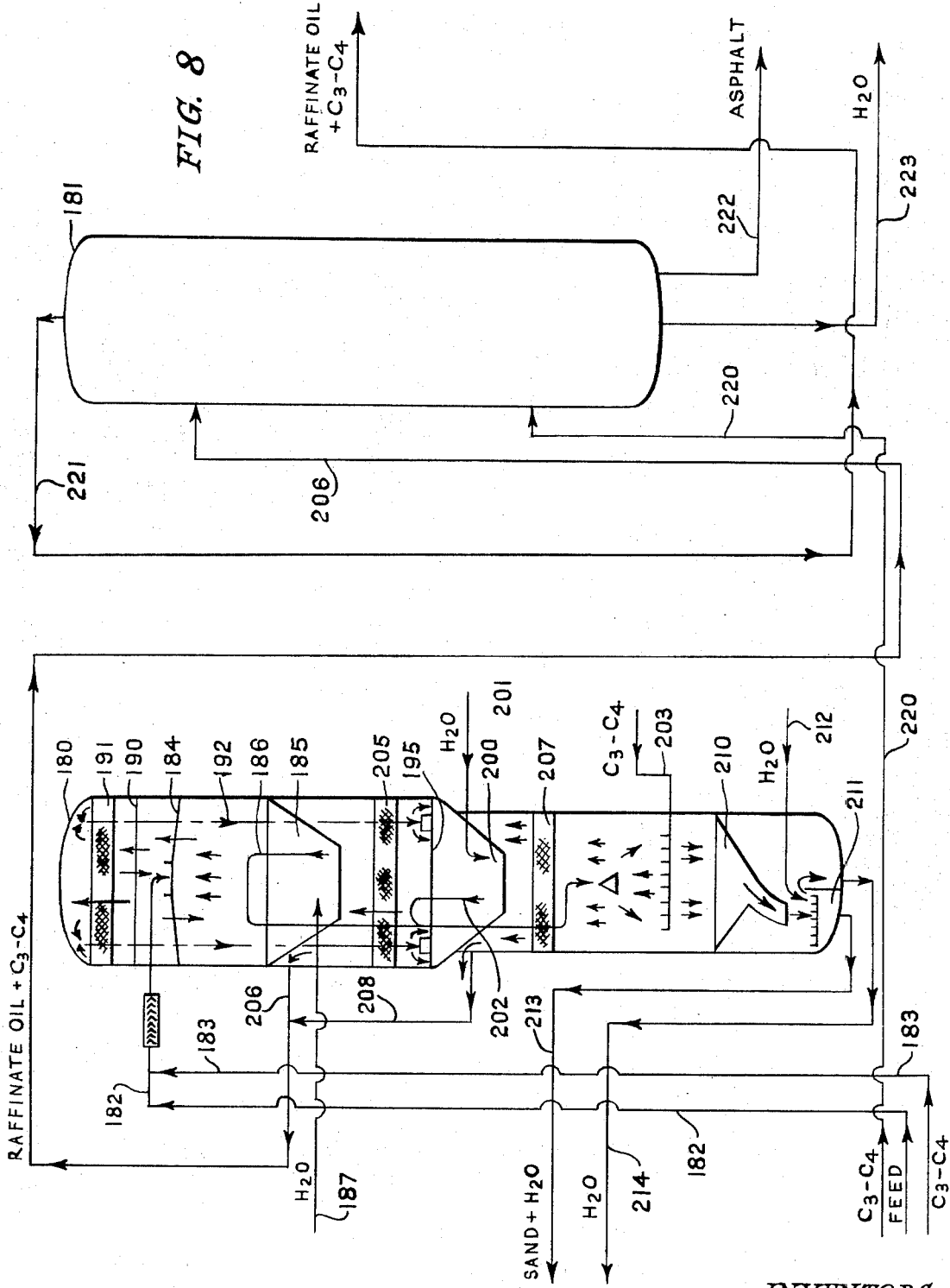

FIG. 7 is a generally schematic vertical section taken through a pressure column which is adapted to effect simultaneous dehydration, demineralization and deasphalting of an oil-water emulsion feed passed counter-currently to a rising stream of solvent, the lower portion of the column serving as a stripping zone for the removal of residual raffinate oil from the descending asphalt phase; and FIG. 8 is a generally diagrammatic view of interconnected separating columns, one of which (shown in section) serves to dehydrate and demineralize the oil-water emulsion feed, while the other receives the dehydrated oil and effects deasphalting thereof by passing the oil counter-currently to a rising solvent stream.

Figure 1:
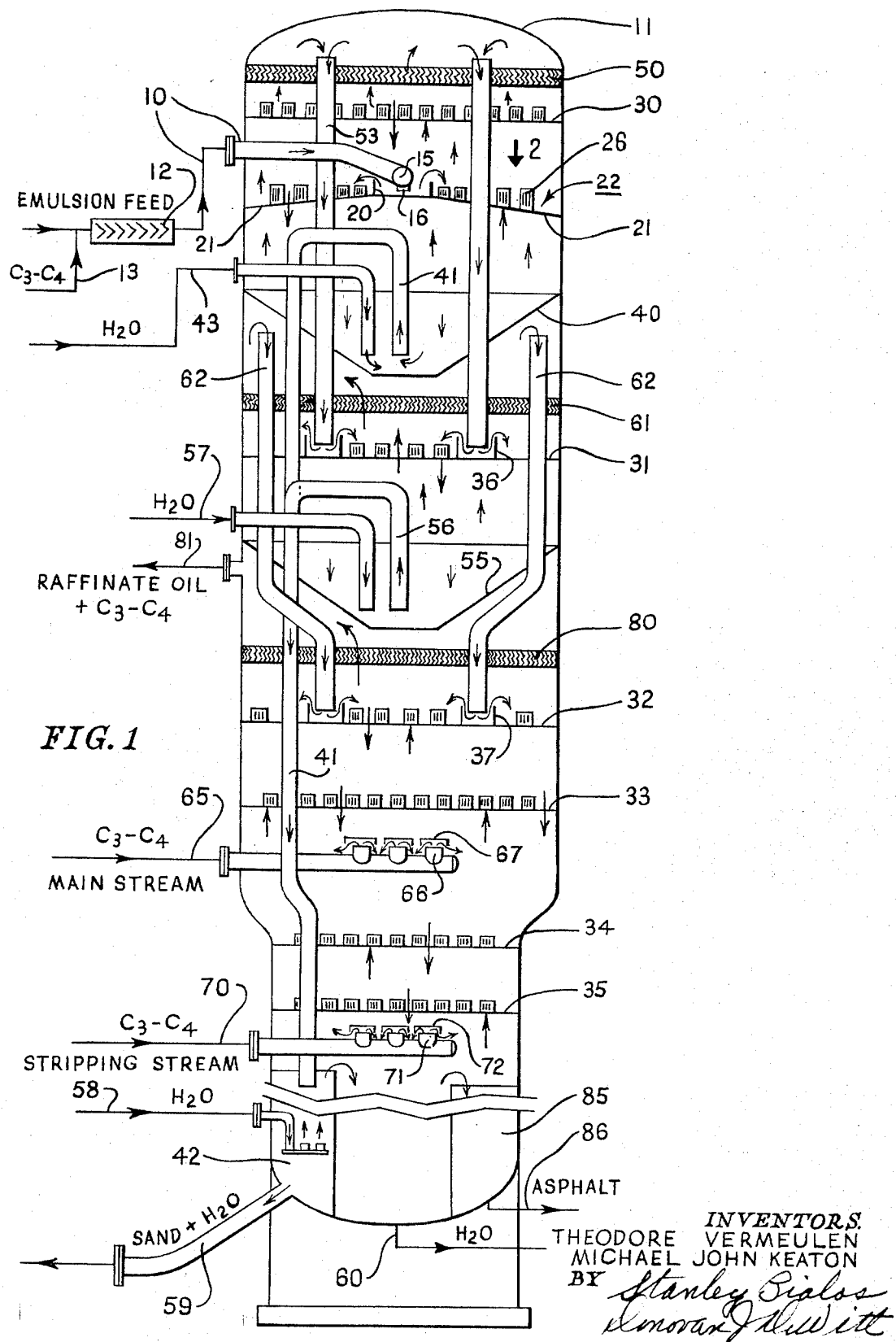
FIG. 1 is a generally schematic vertical section through a pressure column which is adapted in its upper portion to effect dehydration and demineralization of an oil-water emulsion feed, as premixed with solvent, and in its lower portion to effect deasphalting of the resulting dehydrated oil as the latter is passed counter-currently through a rising solvent stream.

Referring more particularly to FIG. 1, there is shown apparatus operating at 170° to 240° F. and at solvent-liquifying pressures, for the concomitant dehydration, demineralization and deasphalting of the oil present in a heavy oil-water emulsion feed such as one obtained by the hot water extraction of a tar-oil sand. Said feed is supplied through line 10 to a pressure column 11 as premixed in zone 12 with a $C_3$–$C_4$ solvent stream supplied through line 13 in amounts ranging from 0.5 to 2 volumes per volume of (dry) oil in the feed. Line 10 is connected in the column to a feed distribution header 15 provided along its length with an array of feed discharge nozzles 16, as best shown in FIG. 2. The feed from said nozzles enters a horizontal trough 20 from which it overflows onto the connecting, downwardly inclined portions 21 of a feed distribution tray generally indicated at 22. Said tray is provided with downflow slots 25 and with capped cylindrical risers 26 each of which is vertically slotted, as indicated at 27 in FIG. 3, to impart a horizontal component of flow to liquid moving upwardly in the column through said risers. For the sake of simplicity, risers not shown by a circle in FIG. 2 are indicated with a cross. Similarly, the figure shows only a representative number of the downflow slots 25 to indicate their pattern of distribution across the tray.

From top to bottom, column 11 is provided with horizontal trays 30, 31, 32, 33, 34 anud 35, each of which incorporates downflow slots and capped slotted risers similar to those indicated in FIG. 2 for tray 22. FIG. 5 shows a typical section of tray 30, with its downcomer slots 25' and a riser 26' slotted at 27'. Trays 31 and 32 are also provided with troughs 36 and 37, respectively, which receive partially dehydrated oil (trough 36) and fully dehydrated oil (trough 37) from upper sections of the column for istribution over said trays 31 and 32.

In operation, column 11 is filled with liquid, and various oil-water interfaces exist at different levels within the column, as discussed below. The mixed emulsion feed and solvent stream which is continuously discharge onto tray 22 is there rapily demulsified. The water phase, along with sand particles and some oil, passes downwardly into a first gavity-settling chamber having a truncated conical bottom 40. Water and sand which settle out in this chamber are withdrawn through conduit 41 for discharge into a receiving chamber 42 positioned at the bottom of the column along one side thereof. The withdrawal of sand above bottom 40 is facilitated by the mixing action exerted by a pressurized stream of hot water entering through line 43, said stream also acting to control the level of the oil-water interphase existing below tray 22.

The oil phase of the feed, along with $C_3$–$C_4$ solvent, passes upwardly from tray 22 through tray 30 and a baffle 50 (sectionally shown in FIG. 4) which is provided with serpentine pathways 51 serving to effect deentrainment of larger water particles which may still be present in the rising oil stream. On passing through baffle 50, the partially dehydrated oil-solvent solution enters conduits 53 for discharge into troughs 36 of tray 31. A second gravity-settling chamber having a bottom 55 is provided below tray 31, and water and sand which settle out above bottom 55 are continuously withdrawn through conduit 56 and connecting conduit 41 for discharge into the chamber 42. Here again, as in the overlying settling chamber, a high pressure hot water stream is introduced through line 57 to facilitate sand removal and establish the oil-water interface at the desired level below tray 31.

The water and sand particles which enter receiving chamber 42 at the bottom of the column encounter a high pressure, hot water stream introduced through line 58. A mixed sand and water stream is thus continuously discharged from the column through line 59, while residual water, now free of sand, overflows the inner wall of chamber 42 for passage downwardly through an oil-asphalt interface (established below the top of said chamber) for discharge at the bottom of the column through line 60.

The oil-solvent phase rising in the column above tray 31 passes through a second baffle 61, similar to baffle 50, for discharge through conduits 62 onto tray 32 in the lower portion of the column which serves as a deasphalting zone. In this (lower) portion, the solvent content of the liquid (3.5 to 10 volumes per volume of oil) is much higher than that which prevails (0.5 to 2 volumes per volume of oil) in the upper portion of the column which serves as a demulsifying, dehydrating and demineralizing (sand removal) zone. The major portion of the hot, pressure-liquified $C_3$–$C_4$ solvent within this deasphalting portion of the column is continuously supplied through line 65 for discharge through nozzles 66 each of which carries an overlying distribution baffle 67, as particularly shown in FIG. 6. Lesser quantities of the solvent, which exert a final stripping action on the descending asphalt phase, are introduced at a lower level through line 70 having nozzles 71 and baffles 72 similar to those shown in FIG. 6.

The dehydrated oil discharged into the troughs 37 for overflow onto tray 32 is thereon rapidly admixed with the solvent-rich liquid which dissolves out the lighter, or raffinate-oil, component. The resulting raffinate-solvent solution is carried upwardly through a third baffle member 80 having a construction generally similar to baffle 50 and adapted to prevent passage of heavier asphaltic particles which may be present. Above baffle 80, the oil is carried out of the column through line 81 for removal (not shown) of its solvent component which is then recycled back to the column. The heavier asphaltic components of the oil introduded onto tray 32 flow downwardly in the column through trays 33, 34 and 35, the asphalt at this lowest juncture now being fully stripped of its raffinate-oil component. The asphalt layer which forms above the water present at the bottom of the column continuously flows into asphalt recieving chamber 85 for discharge through line 86. In most cases this asphalt stream will also be processed so as to recover therefrom any solvent which is present.

In FIG. 7 there is shown apparatus, also operated at 170° to 240° F. and at solvent-liquification pressure, for the simultaneous dehydration, demineralization and deasphalting of a tar-oil froth or other heavy, oil-water emulsion feed. Here the feed is supplied near the top of column 101 through line 102, optionally premixed with a small amount (below about 2 volumes per volumes per volume of oil) of the $C_3$–$C_4$ solvent as supplied through line 103. The feed is discharged through a header 104 and nozzles 105 into a trough 110 of an inclined feed distribution tray generally indicated at 111 and having the same construction as tray 22 in FIGS. 1 and 2. Doubly inclined trays 112 and 113, positioned lower in the column, are of this same general construction, they being adapted to receive and distribute across the column partially dehydrated asphalt-rich fractions (tray 112) or more fully dehydrated and relatively more asphalt-rich fractions (tray 113). The column is also provided with horizontal trays 114, 115, 116, 117, 118, 119 and 120, all of similar construction, which incorporate flow slots and capped, vertically slotted risers, and are similar in construction to tray 30, for example, in FIG. 1. Further, column 101 incorporates two inclined trays 125 and 126 which are free of slots but are provided with capped, vertically slotted risers 127 of the same design as risers 26 shown in FIG. 3. The trays 125 and 126 each have a truncate lower edge thereby providing a space between each such edge and the adjacent wall of the column. These spaces overlie gravity-settling chambers 130 and 131 in which water and sand settle out, together with a supernatant asphalt-rich layer. A conduit member 135 is in communication with an upper level of chamber 130 and serves to draw off in continuous fashion the supernatant asphalt layer for discharge onto tray 112. Conduit 136 performs a similar function and leads from chamber 131 to tray 113, each said tray being provided with a receiving trough.

The major portion of the hot pressurized $C_3$–$C_4$ solvent provided to column 101 is introduced through line 140, while a stripping solvent stream of lesser volume is supplied through line 141, the solvent in each case being discharged through baffled nozzles 142 similar to those shown in FIG. 6.

In operation, the solvent streams introduced in lines 140 and 141 rise upwardly in the column (which is always filled with liquid) stripping or otherwise dissolving the raffinate oil from the asphalt-rich stream as it flows downwardly from distribution trays 111, 112 and 113 through the several horizontal trays. Evenually the up-flowing raffinate oil-solvent stream passes through a baffle 145 (having a construction similar to that of baffle 50 and tending to prevent passage therethrough of water and heavier, asphaltic materials) for discharge from the top of the column through line 150. The solvent is recovered from this raffinate oil by conventional means for recycle back to the column.

Continuing with the method of operation of the column shown in FIG. 7, the feed emulsion supplied to tray 111 rapidly demulsifies on being admixed with the upwardly moving, solvent-rich raffinate oil fraction. A large proportion of the raffinate present in the incoming feed emulsion is immediately taken up by this stream and is carried through baffle 145 for discharge through line 150. The heavier portions of the feed, including water, sand and asphalt admixed with water particles and raffinate oil, move downwardly through tray 114 onto the upper surface of inclined tray 125 for contact with the solvent-rich stream passing upwardly through risers 127. The water, sand particles, and asphalt present, including raffinate oil not removed by said stream, fall into settling chamber 130. As indicated in the drawing, the oil and asphalt in said chamber are separated by an interface below the level of conduit 135 through which the asphaltic fraction is continuously withdrawn for discharge onto tray 112. Aided by an incoming stream of hot, pressurized water in line 155, water and sand particles are continuously swept from chamber 130 through conduit line 156 for discharge into a settling chamber 157 at the bottom of the column. Similarly, as the asphaltic fraction passes downwardly from tray 112 to the upper surface of inclined plate 126, further demulsification and separation of water occur, as does further removal of raffinate oil. More water and sand settle out in chamber 131 and, under the influence of the hot pressurized water entering through line 160, are swept through conduits 161 and 156 into chamber 157. The asphalt layer in chamber 131 continuously drains off through conduit 136 for discharge onto tray 113 and for ultimate passage downwardly in the column through intervening horizontal trays and into a lower compartment 163 from which it is removed from the column through line 171. Sand particles collecting in chamber 157, aided by an incoming stream of hot, pressurized water in line 165, are discharged from the column through line 167. Water not so discharged overflows the chamber 157 and passes through an asphalt layer and out the bottom of the column through line 170.

In FIG. 8 there is shown a cascade recovery system wherein the respective oil and water phases of the feed emulsion, along with sand particles present therein, are separated in column 180, with the solvent-containing oil phase then being recovered and taken to a second column 181 for counter-current extraction with additional quantities of solvent to effect deasphalting of the oil. The construction of the upper portion of column 180, together with its manner of operation, are essentially the same as that of the corresponding portion of column 11 in FIG. 1. Thus, feed in line 182, as premixed with from about 0.5 to 2 volumes of the $C_3$–$C_4$ solvent per volume of oil, as supplied through line 183, are discharged onto the doubly inclined distribution tray 184. Water and sand collect below said tray in the separating chamber 185 for removal through line 186, the sand being maintained in suspension under the influence of the incoming water in line 187. Oil and solvent passing upwardly through tray 184, tray 190 and baffle 191 are carried downwardly through conduits 192 for discharge onto tray 195. Water collects below this plate in chamber 200 and, under the influence of water directed into the chamber through line 201, flows through conduit 202 into the aforesaid conduit 186 for discharge into a lower portion of the column above a point at which a fresh stream of the $C_3$–$C_4$ solvent is introduced through line 203. The oil and solvent rising above tray 195 pass through a baffle 205 for discharge through line 206, this being the principle oil discharge line from the column. The solvent entering in line 203 picks up some additional oil from the water discharged from line 186, and this solvent-rich raffinate oil fraction, after passage through a baffle 207, is then discharged through line 208 from which it enters the main discharge line 206 for passage into an upper portion of deasphalting column 181.

Water and sand flowing downwardly in column 180 below solvent line 203 enter a collection zone 210 for discharge into a sand collection chamber 211 into which a hot, pressurized water stream is directed through line 212. From this chamber, sand and some water are removed through line 213, while the balance of the water overflows and is discharged at the bottom of the column through line 214.

In column 181, which is provided with conventional riser- and downcomer-equipped trays (not shown), the solvent-containing oil stream from line 206 flows counter-currently to a rising stream of $C_3$–$C_4$ solvent as introduced near the bottom of the column through line 220 to bring the total solvent volume in the column to 3.5 to 10 volumes per volume of oil. Temperatures in the column are maintained between 170° and 240° (as in column 180) and the solvent-liquifying pressures maintained in the two columns are also essentially the same. The raffinate oil-solvent stream is taken from column 181 through line 221, while the asphalt is discharged near the bottom of the column through line 222. Any water which collects in column 181 is discharged at the extreme bottom portion thereof through line 223.

While reference has been made herein to the use of a "pressure column," said term is intended to include both one or a series of interconnected columns as well as any equivalent cascade of interconnected vessels adapted to operate under elevated pressures.

In using any of the above or other apparatus embodying the present invention, the various high-pressure water, water-sand raffinate oil and asphaltic streams taken from the separating columns or other vessels employed can be reduced in pressure or otherwise treated to permit recovery of their $C_3$–$C_4$ solvent components. Solvent gases flashed off in this fashion can then be brought back to system pressures and temperatures before being returned either as a diluent in the emulsion feed to the column or as supplied directly thereto at one or more points below that at which the feed is introduced.

In another aspect of the recovering the solvent by treatments, the sand or other solid components withdrawn from the column can be settled through a solvent-free rinse layer of hot water which acts to take up any of the $C_3$–$C_4$ solvent present in the discharged solids. The latter are then removed from the hot water rinse system as a dense slurry or paste.

EXAMPLE

The invention is illustrated by a batch run wherein a 1.2-liter cylindrical pressure vessel, having valves at its top and bottom, was charged with 162 ml. of froth produced from hot-water extraction of tar sands, said froth having an apparent specific gravity of 1.01, a viscosity of 1.5 poise at 210° F., and a hydrogen-carbon weight ratio of 0.125:1. A propane-butane mixture (equal parts by volume) was then introduced into the vessel to the extent of 806 ml., as measured at 60° F., corresponding to a volume ratio at 60° F. of 5.0 parts propane-butane per part of froth. This represented a volume ratio of 6.3 parts propane-butane per part of (dry) oil in the froth. The vessel was then sealed and its contents were heated to 195° F., agitated vigorously for 10 min., and allowed to settle for 30 min. while being held at 195° F. The pressure which was reached and maintained in this treating operation was 370 lb./in.$^2$ gage. The vessel was then withdrawn from the thermostat bath, and a valve at the bottom of the vessel was carefully opened. The first product withdrawn was a mixture of 10 gm. of sand and 25 gm. of water. The second product, withdrawn into another container, was recovered as a cold dark-brown porous solid (asphalt), so formed by rapid discharge, with cooling, of accompanying solvent and totalling 39 gm. This product separated cleanly from the overlying mahogany-colored liquid, out of which propane was evaporated off through a valve at the top of the vessel while again heating the vessel in the thermostat bath, with the bottom valve being closed. The oil phase recovered following this solvent removal step totalled 90 gm. Thus, the froth originally charged yielded the following product phases:

Raffinate (oil) phase: 90 g. 54.9% by wt.=69.8% of the "tar-oil"
Residuum (asphalt) phase: 39 g. 23.8% by wt.=30.2% the "tar-oil"
Water phase: 25 g. 15.2% by wt.
Sand: 10 g. 6.1% by wt.

The oil phase had a 0.965 specific gravity, −10° F. ASTM pour point, 740 Saybolt Universal seconds viscosity at 122° F., 4.5% Conradson carbon residue, and an apparent molecular weight of 450; contained 11.1% hydrogen and 3.7% sulfur; and was ash-free. The asphalt phase had 1.046 specific gravity, 194° F. ASTM softening point, and an apparent molecular weight of 550, and contained 9.0% hydrogen and 6.7% sulfur.

I claim:

1. A method for demulsifying tar-oil froths and other heavy oil-water emulsions stabilized by colloidal solid particles, which comprises admixing with the emulsion a $C_3$–$C_4$ hydrocarbon solvent at temperatures in a range of from 170° to about 240° F. and at pressures which are at or above those required to maintain the solvent in the liquid condition at the temperatures employed, said solvent being present in an amount of about 0.5 to 10 volumes per volume of oil in the emulsion, allowing the resulting mixture to separate into (a) an oil-solvent layer and a water layer or (b) a solvent-rich raffinate oil layer, an asphaltic layer and a water layer, said water layer suspends solid particulates from the emulsion, and separating the solvent from said oil.

2. A method as recited in claim 1 wherein the solvent is employed in an amount of from about 0.5 to 2 volumes per volume of oil and wherein said mixture is separated into a single solvent-containing oil phase and a water phase which contains solid components initially dispersed in the emulsion.

3. A method as recited in claim 1 wherein the solvent is employed in an amount of from about 3.5 to 10 volumes per volume of oil and wherein said mixture is separated into a solvent-rich raffinate oil layer, a predominantly asphaltic layer, and a water layer which contains solid components initially dispersed in the emulsion.

4. A continuous method for demulsifying tar-oil froths and other heavy oil-water emulsions and for separating the same into raffinate oil, asphaltic and water components which comprises continuously introducing a mixture of the emulsion and a $C_3$–$C_4$ solvent into an upper portion of a pressure column for separating a water phase from said mixture, contacting said mixture with a rising stream of additional $C_3$–$C_4$ solvent which is continuously introduced into a lower portion of the column in an amount of from about 3.5 to 10 volumes per volume of oil in the emulsion, said column being operated at a temperature of from 170° to about 240° F. and at a pressure which is sufficient to maintain the solvent in the liquid phase at the temperature employed, the amount of solvent introduced to said column being sufficient to provide further separation whereby said mixture is separated into a solvent-rich raffinate oil fraction, a predominantely asphaltic fraction and a water phase which contains solid components initially dispersed in said emulsion, and continuously withdrawing from the column said water phase, said solvent-rich raffinate oil fraction and said asphaltic fraction.

5. The method as recited in claim 4 wherein a minor portion of not more than 2 volumes of the $C_3$–$C_4$ solvent is pre-mixed with the emulsion introduced into the column.

6. The method as recited in claim 4 in which said solid components are settled in the bottom of said column through a rinse layer of solvent free hot water and are removed from said column as a dense slurry or paste.

References Cited

UNITED STATES PATENTS

| 2,018,377 | 10/1935 | Miller | 208—39 |
| 2,235,639 | 3/1941 | Koch | 208—188 |
| 2,383,362 | 8/1945 | Batchelder | 208—45 |
| 3,267,998 | 8/1966 | Simpson | 208—39 |

DELBERT E. GANTZ, Primary Examiner
G. J. CRASANAKIS, Assistant Examiner

U.S. Cl. X.R.

208—45